US006666497B2

(12) United States Patent
Ohba

(10) Patent No.: US 6,666,497 B2
(45) Date of Patent: Dec. 23, 2003

(54) DOOR HINGE MOUNTING STRUCTURE

(75) Inventor: Toshiya Ohba, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/230,283

(22) Filed: Aug. 29, 2002

(65) Prior Publication Data

US 2003/0042757 A1 Mar. 6, 2003

(30) Foreign Application Priority Data

Aug. 31, 2001 (JP) ..................................... P.2001-264260

(51) Int. Cl.$^7$ .................................................. B60J 5/00

(52) U.S. Cl. ............................ 296/146.11; 296/146.08; 16/261; 16/270

(58) Field of Search ......................... 296/146.8, 146.11; 16/261, 270, 271, 382

(56) References Cited

U.S. PATENT DOCUMENTS 5,876,086 A * 3/1999 Lagrou et al. ......... 296/146.11
6,086,143 A * 7/2000 Schroeder et al. ..... 296/146.11
6,196,617 B1 * 3/2001 Beck ..................... 296/146.11

FOREIGN PATENT DOCUMENTS

| | | | |
|---|---|---|---|
| DE | 101 04 041 | A1 | 8/2002 |
| EP | 0 435 490 | A2 | 7/1991 |

* cited by examiner

*Primary Examiner*—Joseph D. Pape
*Assistant Examiner*—Lori L Coletta
(74) *Attorney, Agent, or Firm*—Sughrue Mion, PLLC

(57) ABSTRACT

In a door hinge mounting structure, a retaining member having a threaded hole formed therein is provided in the interior of a door panel or a door mounting portion on a vehicle body. A positioning bolt is screwed into the threaded hole via a positioning bolt passable hole formed in the door panel or the door mounting portion. A door hinge is positioned based on the position of the positioning bolt so mounted. In the door hinge mounting structure, the positioning bolt passable hole is formed larger in diameter than the threaded hole in the retaining member. Restrictive wall portions are provided in the interior of the door panel or the door mounting portion for restricting the movement of the retaining member within a range in which the positioning bolt passable hole and the threaded hole in the retaining member substantially coincide in position with each other.

14 Claims, 10 Drawing Sheets

DOOR HINGE MOUNTING STRUCTURE

BACKGROUND OF THE INVENTION

The present invention relates to a door hinge mounting structure, and more particularly to a door hinge mounting structure for a door panel or a door mounting portion of a vehicle body, that positions the door hinge on the vehicle body side or the door side on an assembly line of automobiles when the door is remounted on the vehicle body after the door has been temporarily mounted on the vehicle body for painting and also pieces of equipment have been mounted on the vehicle side and the door side while the door being removed.

In assembling processes of automotive vehicles, painting is performed after door panels are temporarily mounted on the vehicle body. After the painting work has been completed, the door panels are removed from the vehicle body in such a manner that seats can be assembled to the vehicle body and window glass can be assembled to the door panels. Thereafter, the door panels are remounted on the vehicle body at their original positions.

Consequently, in order to reassemble the door panels to the vehicle body, door hinges need to be positioned on the vehicle body side or the door side. Proposed as a door hinge positioning structure as has just been described above is a technology which is described in, for example, JP-B-6-49798U.

The prior art will be described with reference to FIG. 10.

In the prior art, a positioning bolt passable hole 103 for a positioning bolt 102 is pierced through a pillar outer panel 101, and the positioning bolt 102 is screwed through a threaded hole 105 formed in a retaining plate 104 provided in the interior of the pillar outer panel 101, whereby the positioning bolt 102 is positioned in the pillar outer panel 101. A door hinge 106 is positioned based on this positioning bolt 102.

In addition, the door hinge 106 comprises a moving side bracket 107 and a fixed side bracket 108 which are rotatably assembled together with a connecting pin 109. In addition, reference numeral 110 denotes a door panel.

Incidentally, in the prior art, when the positioning bolt 102 is screwed through the retaining plate 104 provided within the pillar outer panel 101, the positioning bolt passable hole 103 formed in the pillar outer panel 101 deviates largely from the threaded hole 105 in the retaining plate 104 in normal conditions.

Consequently, since the positioning bolt 102 needs to be passed through the positioning bolt passable hole 103 and the threaded hole 105 by matching the positioning bolt passable hole 103 and the threaded hole 105 while holding the retaining plate 104 with a hand, there is caused a problem that the working efficiency is deteriorated.

In addition, in the prior art, in order to improve the efficiency in passing the positioning bolt 102 through the holes, since an inserting portion 111 of a small outside diameter needs to be provided at a distal end of the positioning bolt 102 to facilitate the ingress of the distal end portion of the positioning bolt 102 into the positioning bolt passable hole 103, a general-purpose bolt cannot be used as the positioning bolt, causing a problem that the component costs are increased.

SUMMARY OF THE INVENTION

Accordingly, it is a main object of the invention to provide a door hinge mounting structure which allows the positioning bolt to be passed through the holes without supporting the retaining plate with the hand so that the working efficiency can be improved and which also allows a normal general-purpose bolt to be used as the positioning bolt without using any particular positioning bolt so that the component costs can be reduced.

With a view to attaining the main object, according to a first aspect of the invention, there is provided a door hinge mounting structure in which a retaining member having a threaded hole formed therein is provided in the interior of a door panel or a door mounting portion on a vehicle body and in which a positioning bolt is threadedly engaged with the threaded hole in the retaining member via a positioning bolt passable hole formed in the door panel or the door mounting portion, whereby a door hinge is positioned based on the position of the positioning bolt so mounted, the door hinge mounting structure being characterized in that the positioning bolt passable hole is formed larger than the threaded hole in the retaining member, and in that restrictive wall portions are provided in the interior of the door panel or the door mounting portion on the vehicle body for restricting the movement of the retaining member within a range in which the positioning bolt passable hole and the threaded hole in the retaining member substantially coincide in position with each other.

With this structure, according to the door hinge mounting structure according to the first aspect of the invention, since the movement of the retaining member is limited within a predetermined range by the restrictive wall portions for restricting the moving range of the retaining member, the positioning bolt passable hole and the threaded hole can be matched substantially, whereby the positioning bolt can be passed through the holes without supporting the retaining member with the hand.

In addition, since the positioning bolt passable hole formed in the door panel or the door mounting portion is made larger than the threaded hole in the retaining member, it becomes easier for the positioning bolt to be inserted into the positioning bolt passable hole than in a case where the positioning bolt passable hole is identical in size to the threaded hole. Consequently, no inserting portion of a small outside diameter needs to be additionally formed at the distal end portion of the positioning bolt so as to improve the working efficiency, whereby a general-purpose bolt can be used as the positioning bolt.

According to a second aspect of the invention, there is provided a door hinge mounting structure as set forth in the first aspect of the invention, wherein the retaining member is provided with a projection which protrudes radially outwardly of the threaded hole, and wherein an opening is formed between the restrictive wall portions for passage of the projection.

With this structure, according to the door hinge mounting structure as set forth in the second aspect of the invention, when the positioning bolt is passed through the holes, the retaining member can be prevented from rotating around the threaded hole by the projection on the retaining member and the opening between the restrictive wall portions. Consequently, the rotation of the retaining member can be restricted at positions disposed away from the rotational center of the retaining member without constructing the retaining member itself larger.

Furthermore, according to a third aspect of the invention, there is provided a door hinge mounting structure as set forth in the first or second aspect of the invention, wherein the restrictive wall portions each form a portion which faces the opening along directions in which the retaining member rotates around the threaded hole.

With this structure, according to the door hinge mounting structure as set forth in the third aspect of the invention, since the restrictive wall portions are formed in such a manner as to extend along orientations which are opposite to the rotating directions of the retaining member, the prevention of the rotation of the retaining member can be ensured further.

According to a fourth aspect of the invention, there is provided a door hinge mounting structure as set forth in any of the first, second and third aspects of the invention, wherein the restrictive wall portions are provided in a recessed portion formed on the door panel or the door mounting portion.

With this structure, according to the door hinge mounting structure as set forth in the fourth aspect of the invention, the retaining member is also accommodated in the recessed portion formed on the door panel or the door mounting portion, whereby the door hinge mounting structure can be formed compact. In addition, a great mounting strength can be secured at the door hinge mounting structure.

According to a fifth aspect of the invention, there is provided a door hinge mounting portion as set forth in any of the first to fourth aspects of the invention, wherein the retaining member is provided with a pair of left and right symmetrical projections.

With this structure, according to the door hinge mounting structure as set forth in the fifth aspect of the invention, when inserting the positioning bolt in the threaded hole to screw (threadedly engage) it therethrough forces are exerted on the left and right projections equally, and the forces are dispersed relative to the restrictive wall portions, whereby the projections themselves and the restrictive wall portions may not have to be formed sturdier and larger than required.

DETAILED DESCRIPTION OF PREFERRED EMBODIMENTS

An embodiment of a door hinge mounting structure according to the invention will be described below with reference to the accompanying drawings.

Figure 1:
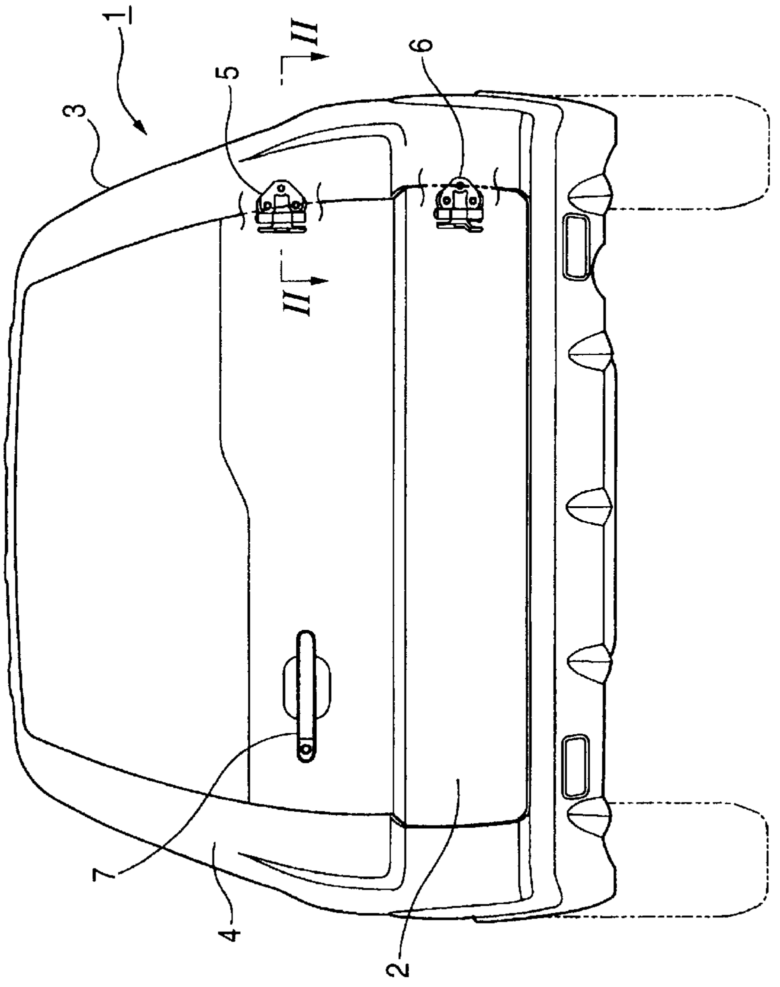
FIG. 1 is a front view of a tail door of an automobile according to an embodiment of the invention which is being assembled on an assembly line.

In the drawings to be referred to, FIG. 1 is a front view of a tail door of an automobile according to an embodiment of the invention which is being assembled on an assembly line.

Note that in this front view portions on a side of a vehicle body at the rear thereof where door hinges are assembled are cutaway so that the door hinges so assemble become visible.

In assembling processes of automobiles, when vehicle bodies are, assembled on a vehicle body assembling line door panels are temporarily mounted on the vehicle bodies, and thereafter the vehicle bodies so assembled are then painted on a painting line. Then, after completion of the painting work on the painting line, the door panels are removed from the vehicle bodies, and on an equipment mounting line seats and so on are assembled to the vehicle bodies, and also window glasses are assembled to the door panels. Then, after all the work has been completed, the door panels are then re-assembled to their original positions on the vehicle bodies.

Consequently, as shown in FIG. 1, the door hinge mounting structure according to the embodiment of the invention is applied to an automobile 1 which is being assembled on the vehicle body assembling line, and more particularly is applied to an upper hinge 5 and a lower hinge 6 which are constructed to mount a tail door panel 2 of the automobile 1 to a door mounting portion 4 on a right side portion of a vehicle body 3. Reference numeral 7 denotes a door handle. Since an identical mounting structure to that applied to the upper hinge 5 is applied to the lower hinge 6, in this embodiment, the door hinge structure will be described only with reference to the upper hinge 5.

Figure 2:
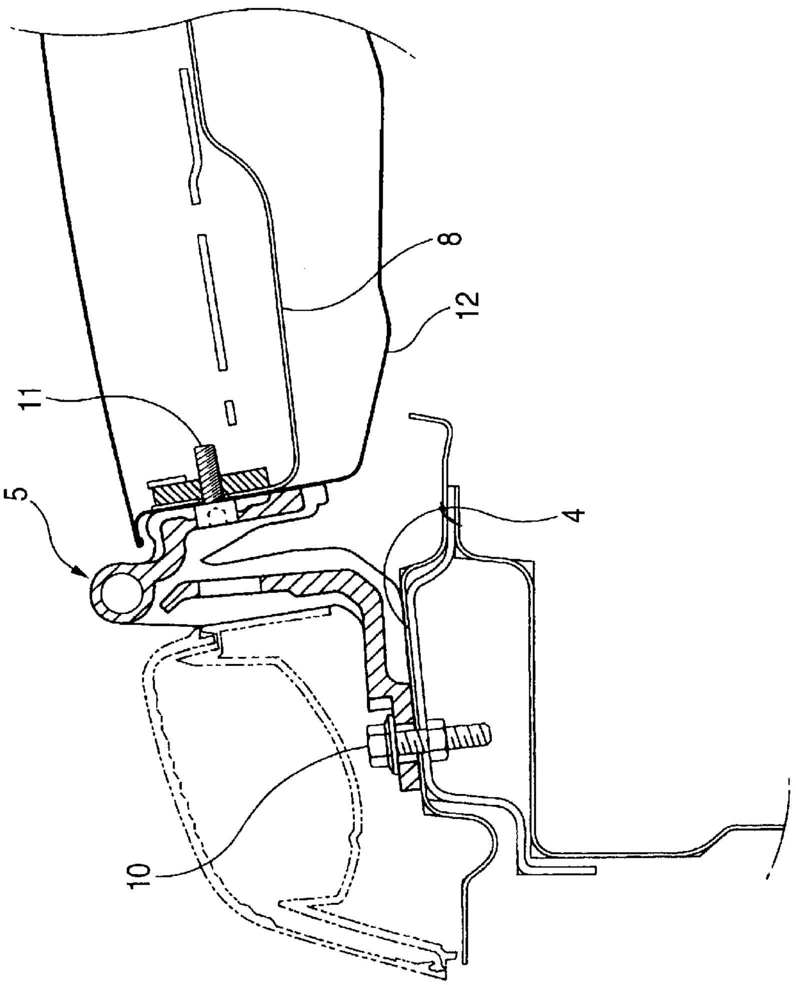
FIG. 2 is a horizontal cross-sectional view taken along the line II—II in FIG. 1.
Figure 3:
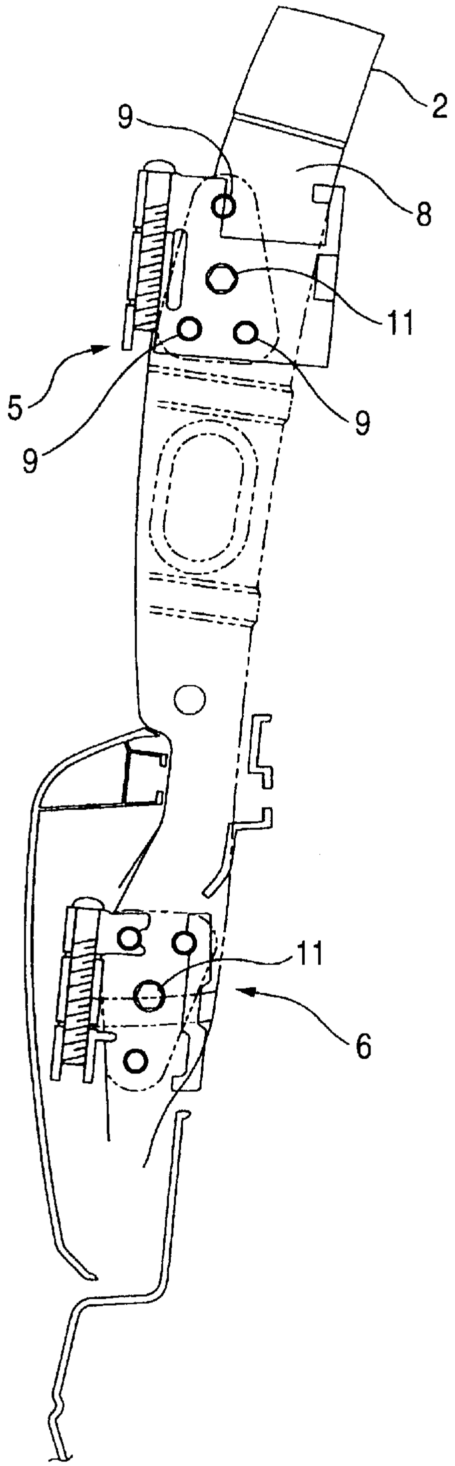
FIG. 3 is a right side view of the tail door.

FIG. 2 is a horizontal cross-sectional view taken along the line II—II shown in FIG. 1, and FIG. 3 is a right side view of the tail door.

In the figures, the upper hinge 5 fixed to a door frame 8 of the door panel 2 with bolts 9 is also fixed to the door mounting portion 4 of the vehicle body 3 with bolts 10, and the door panel 2 is mounted rotatably through rotations of this upper hinge 5 (and the lower hinge 6). Reference numeral 11 denotes a positioning bolt, which will be described in detail later.

Note that reference numeral 12 denoted a thin plate-like door skin.

Figure 4A:
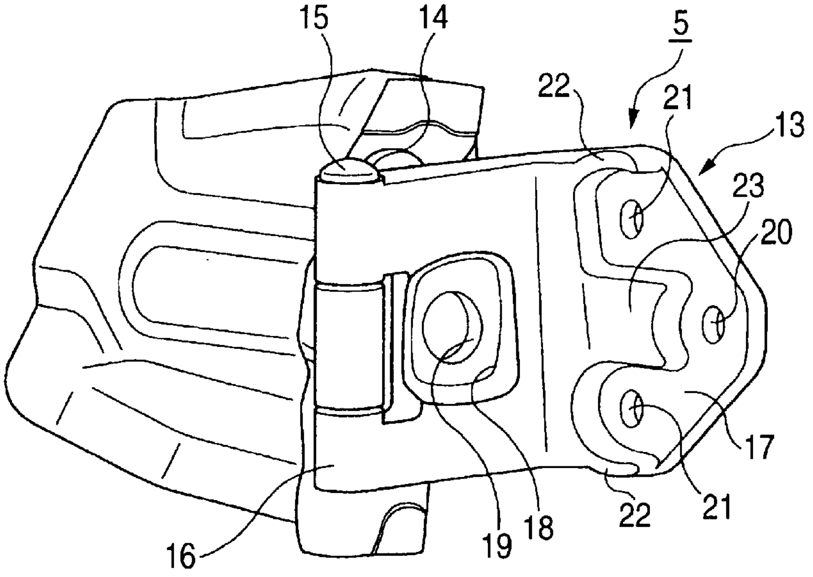
FIG. 4A is a perspective view showing a piece of an upper hinge which is fixed to the vehicle body side.
Figure 4B:
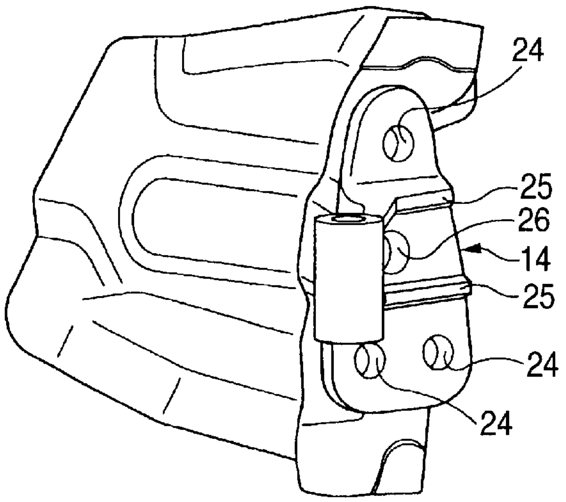
FIG. 4B is a perspective view, similar to FIG. 4A, showing a piece of the upper hinge which is fixed to the door panel side.

FIG. 4A is a perspective view showing a piece of the upper hinge which is fixed to the vehicle body side, and similarly, FIG. 4B is a perspective view showing a piece of the upper hinge which is fixed to the door panel side.

As shown in FIG. 4A, the upper hinge 5 is constituted by the vehicle body-side fixed piece 13 and the door panel-side fixed piece 14 which are constructed to be rotatable via pin 15. The vehicle body-side fixed piece 13 is substantially formed into an L-shape and comprises a substantially rectangular positioning bolt passable portion 16 which faces the door panel-side fixed piece 14 and a substantially isosceles triangular fixed portion 17 one of whose-corners or vertexes which is fixed to the vehicle body 3 side is rounded.

Formed in the positioning bolt passable portion 16 is a recessed portion 18 having a difference in level at a central portion thereof. A position bolt passable hole 19 is formed within the recessed portion 18 through which a positioning bolt is passed when the upper hinge 5 is positioned relative to the door frame 8 with a positioning bolt 11, which will be described later. The positioning bolt passable hole 19 become visible by being provided within the recessed portion 18.

Fixed portion 17 constitutes, as described above, substantially an isosceles triangle adopting a side facing the bolt passable portion 16 as a base, and mount holes 20, 21, 21 are formed at positions corresponding to the respective vertexes of the triangle for fixing the upper hinge 5 to the door mounting portion 4 of the vehicle body 3.

Wall portions 22, 22 are formed at positions corresponding to the upper and lower vertexes in such a manner as to partly surround the mount holes 21, 21, respectively, on the bolt passable portion 16 side. In addition, a wider wall portion 23 is formed in such a manner as to separate the mount holes 21, 21 from each other and to extend to a position facing the mount hole 20. A strength is imparted to the upper hinge 5 by these wall portions 22, 23.

As shown in FIG. 4B, the door panel-side fixed piece 14 constitutes substantially an elongate isosceles triangular shape whose corners or vertexes are rounded, and formed at positions corresponding to the respective vertexes of the triangle are fixing holes 24, 24, 24 for fixing the upper hinge 5 to the tail door panel 2. The door panel-side fixed piece 14 has two wall portions 25, 25 formed in parallel to each other for reinforcement thereof. Formed in a central portion of the door panel-side fixed piece 14 which is so isolated by the wall portions 25, 25 is a positioning hole 26 for positioning the upper hinge 5 relative to the door panel 2.

Figure 5:
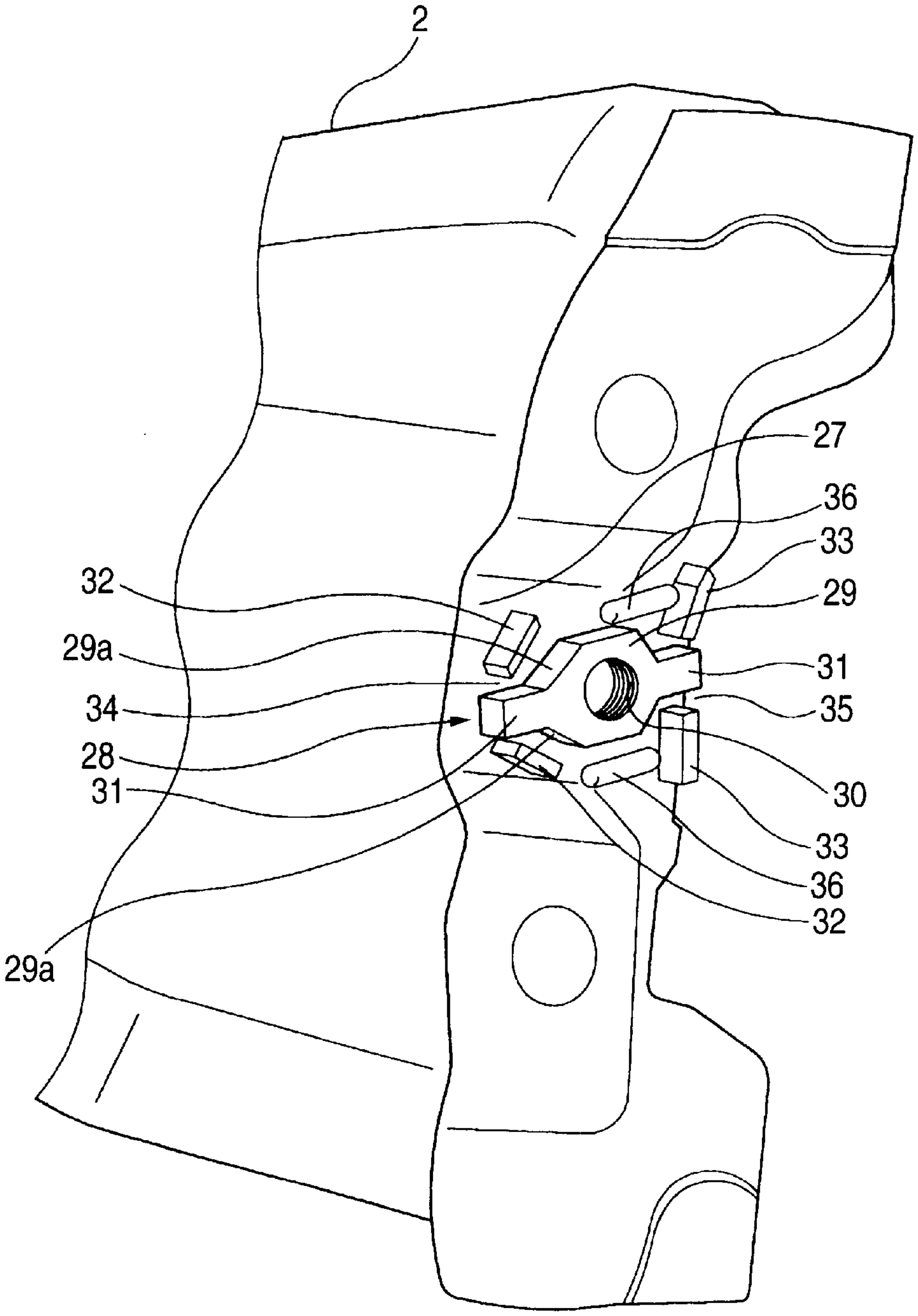
FIG. 5 is a perspective view showing a retaining member for positioning the upper hinge relative to the tail door panel.

FIG. 5 is a perspective view showing a retaining member for positioning the upper hinge relative to the tail door panel.

A reinforcement recessed portion 27 is formed on the tail door panel 2. A retaining member 28 is disposed substantially horizontally in this recessed portion 27 for positioning the upper hinge 5 relative to the tail door panel 2. The door hinge mounting structure can be made compact by accommodating the retaining member 28 in the recessed portion 27, and the mounting strength can also be increased.

In the retaining member 28, a threaded hole 30 is formed in a central portion of a slightly laterally elongate hexagonal main body 29. Internal threads are formed in the threaded hole 30. The threaded hole 30 is a hole into which the positioning bolt shown in FIG. 2 is screwed when the upper hinge 5 is positioned relative to the tail door panel 2. A pair of left and right symmetrical rectangular projections 31, 31 are formed in such a manner as to protrude radially outwardly from the main body 29.

Restrictive wall portions 32, 32 and 33, 33 and 36, 36 are formed within the recessed portion 27 in such a manner as to surround the projections 31, 31 of the retaining member 28. The movable range of the retaining member 28 is restricted by the restrictive wall portions 32, 32 and 33, 33 and 36, 36, whereby the retaining member 28 is allowed to move only within a predetermined range. Since this allows the passable hole and the threaded hole 30 to be substantially matched with each other in terms of position, the positioning bolt 11 can be passed through the holes without supporting the retaining member 28 with the hand.

Openings 34 and 35 are formed between the restrictive wall portions 32, 32 and 33, 33 through which the projections 31 are allowed to pass. In addition, the restrictive wall portions 32, 32 (and 33, 33) form portions facing the opening 34 (and 35) along directions in which the retaining member 28 rotates around the threaded hole 30. As this occurs, the restrictive wall portions 32, 32 becomes substantially parallel with inclined side portions **29*a*, 29*a* of the hexagonal main body 29**.

Thus, since the restrictive wall portions 32, 32 are formed in such a manner as to extend along orientations which are opposite to the rotating directions of the retaining member 28, so that the restrictive wall portions 32, 32 and the inclined side portions **29*a*, 29*a* of the main body 29 of the retaining member 28 become substantially parallel with each other, the pair of left and right projections 31, 31 of the retaining member 28 are securely received by the respective wall portions 32, 32 when they try to rotate when the positioning bolt 11 shown in FIG. 2 is screwed into the retaining member 28, whereby the rotation of the retaining member 28 around the threaded hole 30 can be prevented. Consequently, the rotation of the retaining member 28 can be restricted from positions disposed away from the rotational center (the threaded hole 30) of the retaining member 28 without constructing the retaining member 28** itself larger.

In addition, the movement of the retaining member 28 is also restricted by the pair of upper and lower post-like restrictive members 36, 36 provided in the recessed portion 27 on both sides of the main body 29.

Thus, as has been described heretofore, since the pair of left and right projections 31, 31 and the main body 29 of the retaining member 28 are restricted by the restrictive wall portions 32, 32, 33, 33 and the restrictive members 36, 36, forces are exerted on the left and right projections 31, 31 equally when the positioning bolt 11 is passed and screwed through the threaded hole 30 in the retaining member 28. Moreover, since the main body 29 is restricted by the restrictive members 36, 36, the forces are dispersed to the restrictive wall portions 32, 32, 33, 33 and the restrictive members 36, 36. Therefore, the restrictive wall portions 32, 32, 33, 33 and the restrictive members 36, 36 do not have to be formed sturdier than required.

Figure 6A:
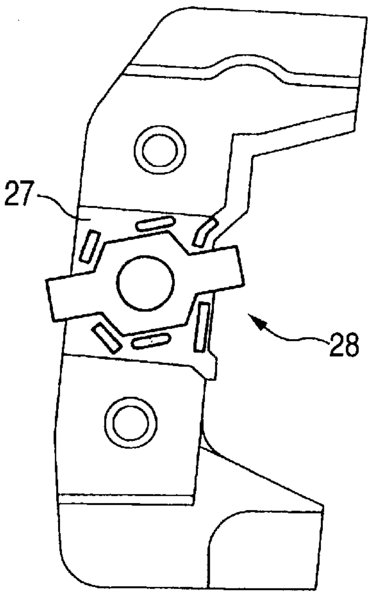
FIG. 6A is a view showing a state in which the retaining member is disposed in a recessed portion on the tail door panel.
Figure 6B:
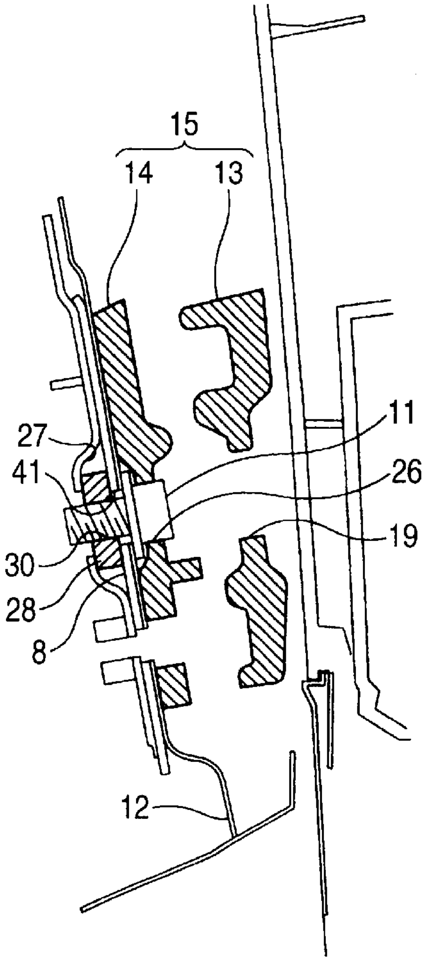
FIG. 6B is a vertical sectional view showing a state in which the upper hinge is mounted on the tail door panel.

FIG. 6A is a view showing a state in which the retaining member 28 is disposed in a recessed portion on the tail door panel, and FIG. 6B is a vertical sectional view showing a state in which the upper hinge is mounted on the tail door panel.

As shown in FIG. 6A, the retaining member 28 is disposed in the recessed portion 27 for positioning the upper hinge 5 on the door frame 8.

In addition, as shown in FIG. 6B, a bolt passable hole 41 is formed in the door frame 8 and the door skin 12. This bolt passable hole 41 is formed larger than the threaded hole 30 formed in the retaining member 28. Since the movement of the retaining member 28 disposed in the recessed portion 27 is restricted to a range where the threaded hole 30 substantially matches the passable hole 41 in position by the restrictive wall portions 32, 32, 33, 33 and the restrictive members 36, 36 (FIG. 5), the positioning bolt 11 can be screwed into the threaded hole 30 via the passable hole 41 without supporting the retaining member with the hand, whereby an extremely good working efficiency can be obtained.

In addition, since the positioning bolt 11 is allowed to be inserted so easily, there is no need to form additionally an inserting portion of a smaller outside diameter at a distal end portion of the positioning bolt 11 in order to increase the working efficiency, and therefore, a general-purpose bolt, which will be described later, can eventually be used as the positioning bolt.

In addition, since the retaining member 28 mounted in the recessed portion 27 is covered with the door frame 8 and the door skin 12, the retaining member 28 is set in the interior of the tail door panel 2, whereby it can be invisible from the outside, resulting in a good external appearance.

Figure 7:
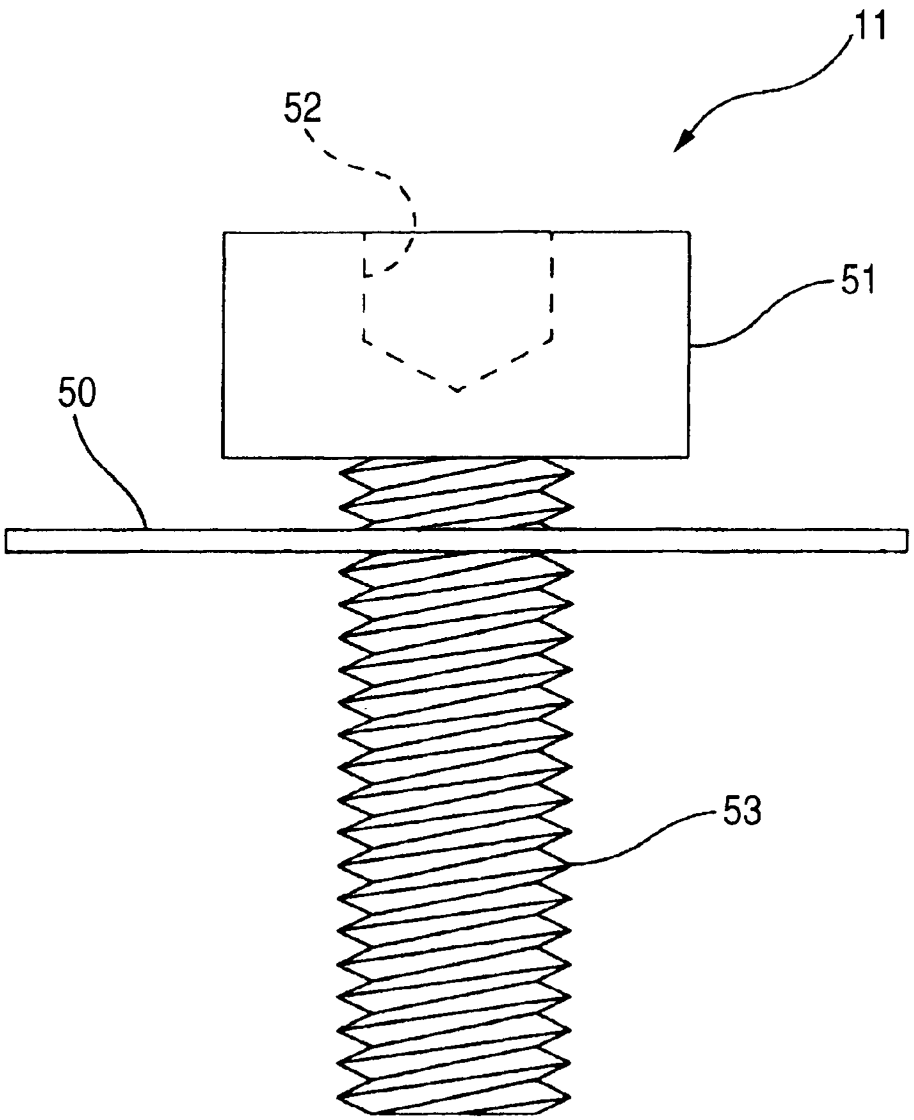
FIG. 7 is a side view of a positioning bolt.

FIG. 7 is a side view of the positioning bolt.

The positioning bolt 11 is a socket bolt with a general-purpose washer 50, and a hexagonal hole 52 is formed in a head portion 51 with a threaded portion 53 having the same diameter along the full length thereof from the head portion 53 side to a distal end thereof.

Since the socket bolt with the general-purpose washer can be used as the positioning bolt 11, there is no need to prepare a special positioning bolt provided with an inserting portion of a small diameter at a distal end thereof, whereby the number of components can be reduced, and therefore the components costs can be in turn reduced.

After having been positioned with the positioning bolt 11 being passed through the positioning hole 26, the upper hinge 5 is temporarily mounted by screwing bolts into the fixing holes 24 to the tail door panel 2 and the mount holes 20, 21 to the door mounting portion 4 of the vehicle body 3. Next, the door panel is transferred to a sub-line (such as an equipment mounting line) where a window glass is fitted with the upper hinge 5 being kept temporarily fastened thereto. After the fitment of equipment has been completed, the tail door panel is assembled again to the vehicle body on the body assembly line by fastening the upper hinge after the upper hinge has been positioned as has been described above.

Next, the function of the door hinge mounting structure of the invention will be described which is constructed as has been described heretofore.

FIGS. 8A, 8B, 8C, 8D are views showing the transition of the position of the retaining member provided in the interior of the door frame due to scattering generated when the upper hinge is applied to the retaining member.

Figure 8A:
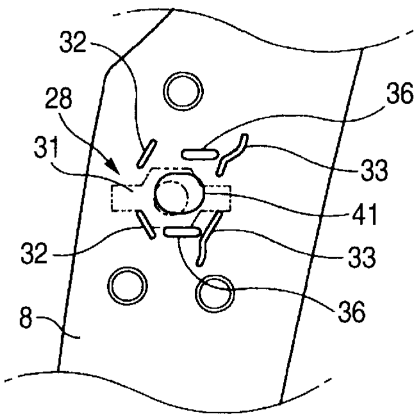
FIGS. 8A, 8B, 8C, 8D are view showing the transition of the position of the retaining member due to scattering generated when the upper hinge is applied to the retaining member provided in the interior of the door frame.

FIG. 8A shows a state in which the retaining member 28 deviates 1.5 mm downwardly and 3 mm leftward relative to its reference set position (denoted by reference numeral 41 in the figure: corresponding the passable hole 41 in the door frame 8 and the door skin 12), whereby the left-hand projection 31 abuts with the lower restrictive wall portion 32 (shown by broken lines).

Note that the in the state shown in the figure the upper hinge 5 is removed (this is also true hereinafter).

Figure 8B:
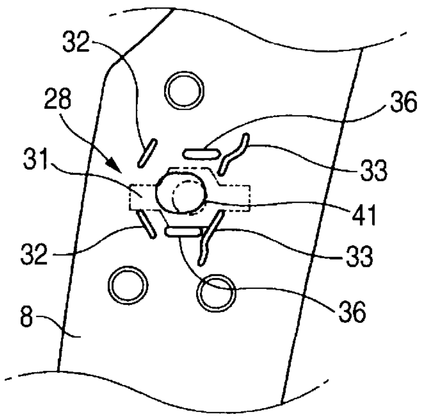

FIG. 8B shows a state in which the retaining member 28 deviates 1.5 mm downwardly and 3 mm rightward relative to its reference set position (denoted by reference numeral 41 in the figure: corresponding the passable hole 41 in the door frame 8 and the door skin 12), whereby the left-hand projection 31 abuts with the lower restrictive wall portion 32 whereas the right-hand projection 31 abuts with the lower restrictive wall portion 33 (shown by broken lines).

Figure 8C:
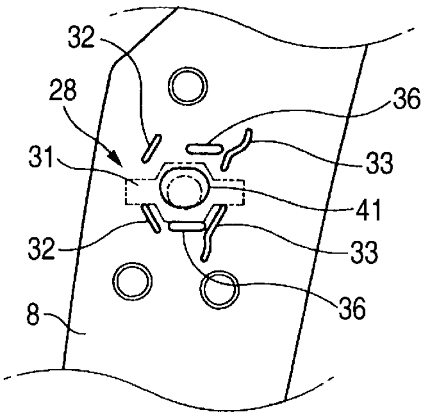

FIG. 8C shows a state in which the retaining member 28 deviates a maximum distance downwardly relative to the reference set position (denoted by reference numeral 41 in the figure: corresponding the passable hole 41 in the door frame 8 and the door skin 12) and the main body 29 abuts with the lower restrictive member 36. Thus, the main body 29 abuts with the lower restrictive member 36 (as illustrated by broken lines). Note that although not shown, when the main body 20 deviates similarly a maximum distance but upwardly, conversely, the main body 29 abuts with the upper restrictive member 36.

Figure 8D:
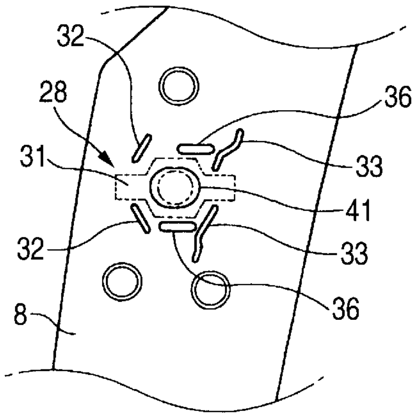

FIG. 8D shows a state in which the retaining member 28 does not deviate relative to the reference set position (denoted by reference numeral 41 in the figure: corresponding the passable hole 41 in the door frame 8 and the door skin 12), whereby the retaining member 28 remains at the reference set position.

Figure 9:
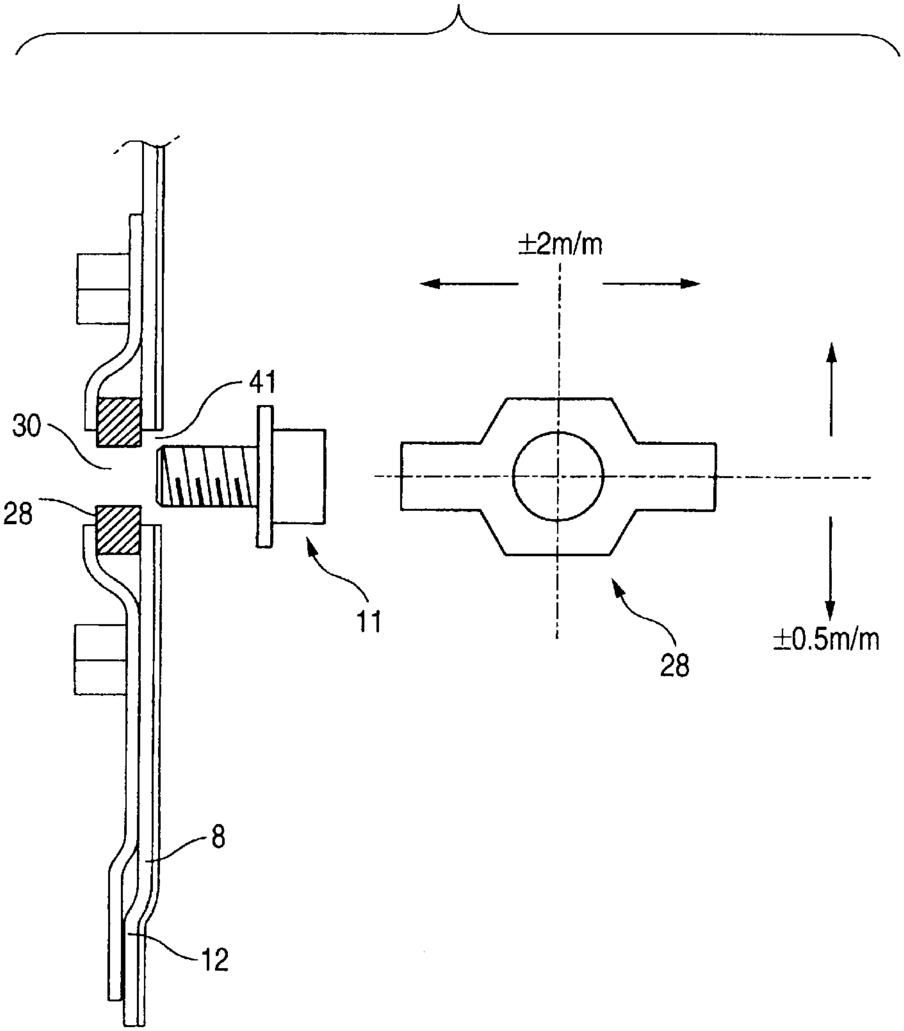
FIG. 9 is a view showing adjustment margins when the retaining member is positioned in the recessed portion on the door frame with the positioning bolt.
Figure 10:
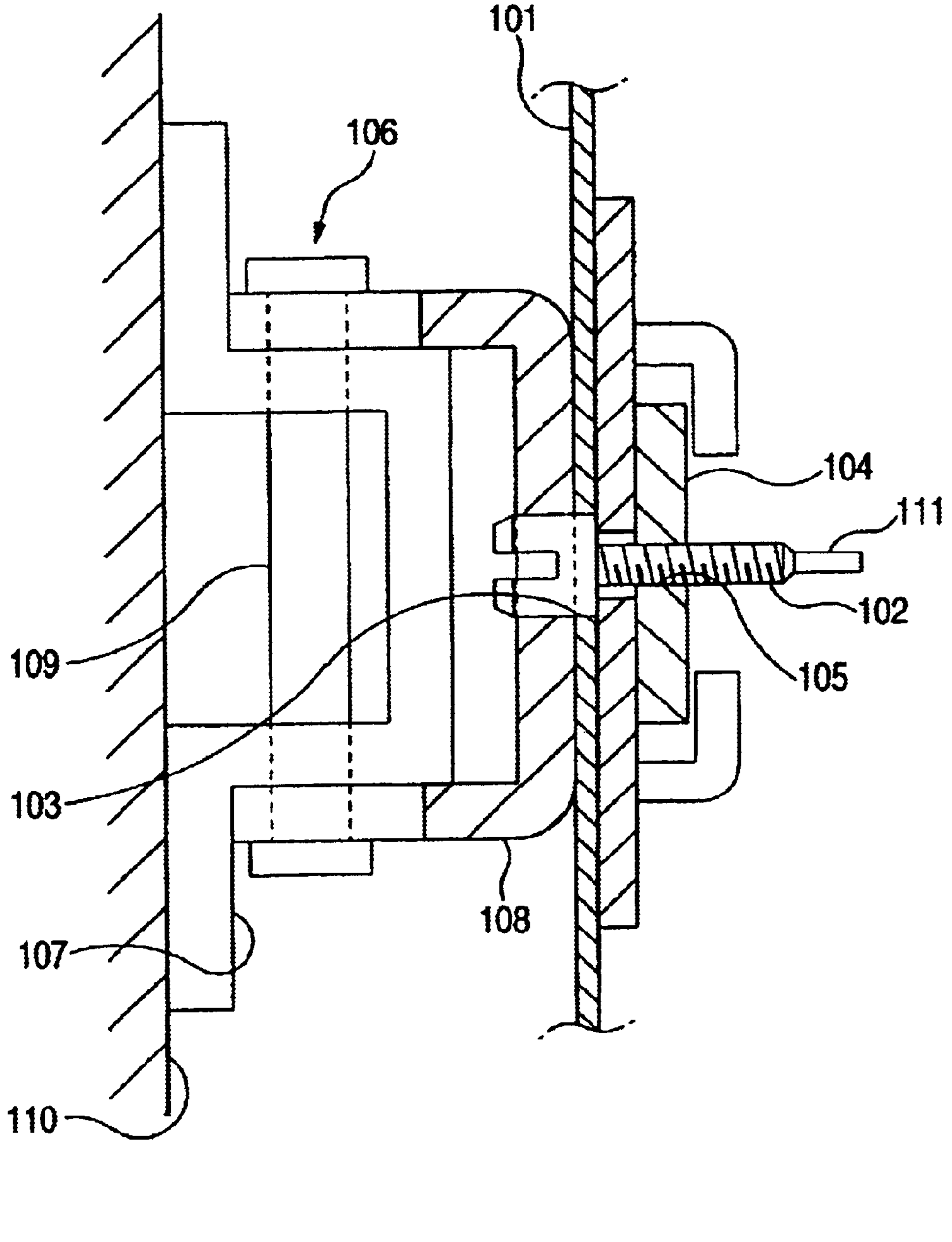
FIG. 10 PRIOR ART
FIG. 10 is a partially cutaway side view describing a main portion of a conventional door hinge mounting structure.

FIG. 9 is a view showing adjustment margins that are taken into consideration when the retaining member is positioned in the recessed portion using the positioning bolt.

The above various deviations occurring when the upper hinge 5 is applied to the door frame 8 are corrected by assembling the upper hinge 5 by screwing the positioning bolt into the positioning bolt passable hole therein.

As shown in the figures, the assembling errors occurring when the retaining member 28 is assembled to the recessed portion 27 of the door frame 8 with the positioning bolt 11 can guarantee adjustment margins upto +/−0.5 mm in vertical directions and +/−2 mm in the transverse directions.

In addition, while the retaining member 28 having the threaded hole 30 is described as being provided in the interior of the tail door panel 2 in this embodiment, it goes without saying that the same effect can be provided even if the retaining member 28 is provided in the interior of the door mounting portion 4 of the vehicle body 3.

As has been described heretofore, with the door hinge mounting structure according to the first aspect of the invention, since the movement of the retaining member is limited within the predetermined range by the restrictive wall portions for restricting the movable range of the retaining member, the positioning bolt passable hole and the threaded hole can be matched substantially, whereby the positioning bolt can be passed through the holes without supporting the retaining member with a hand.

In addition, since the positioning bolt passable hole formed in the door panel or the door mounting portion is made larger than the threaded hole in the retaining member, it becomes easier for the positioning bolt to be inserted into the positioning bolt passable hole than in a case where the positioning bolt passable hole is identical in size to the threaded hole. Consequently, no inserting portion of a small outside diameter needs to be additionally formed at the distal end portion of the positioning bolt so as to improve the working efficiency, whereby a general-purpose bolt can be used as the positioning bolt.

According to the door hinge mounting structure as set forth in the second aspect of the invention, when the positioning bolt is passed through the holes, the retaining member can be prevented from rotating around the threaded hole by the projection on the retaining member and the opening between the restrictive wall portions. Consequently, the rotation of the retaining member can be restricted at positions disposed away from the rotational center of the retaining member without constructing the retaining member itself larger.

According to the door hinge mounting structure as set forth in the third aspect of the invention, since the restrictive wall portions are formed in such a manner as to extend along orientations which are opposite to the rotating directions of the retaining member, the prevention of the rotation of the retaining member can be ensured further.

According to the door hinge mounting structure as set forth in the fourth aspect of the invention, the retaining member is also accommodated in the recessed portion formed on the door panel or the door mounting portion, whereby the door hinge mounting structure can be formed compact.

According to the door hinge mounting structure as set forth in the fifth aspect of the invention, when inserting the positioning bolt in the threaded hole to screw it therethrough forces are exerted on the left and right projections equally, and the forces are dispersed relative to the restrictive wall portions, whereby the projections themselves and the restrictive wall portions may not have to be formed sturdier and larger than required, the door hinge mounting structure being thereby made compact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A door hinge mounting structure comprising:

a door hinge to be mounted on a door panel or a door mounting portion of a vehicle body, said door hinge having a positioning hole;

a retaining member having a threaded hole and provided in the interior of the door panel or the door mounting portion;

a positioning bolt passing through said positioning hole of said door hinge and a positioning bolt passable hole formed in said door panel or said door mounting portion and then threadedly engaged with said threaded hole of said retaining member, whereby said door hinge is positioned relative to said door panel or the door mounting portion;

restrictive wall portions provided in the interior of said door panel or said door mounting portion for restricting the movement of said retaining member within a range in which said positioning bolt passable hole and said threaded hole substantially coincide in position with each other, wherein said positioning bolt passable hole is formed larger in diameter than said threaded hole.

2. The door hinge mounting structure as set forth in claim 1, wherein said retaining member is provided with at least one projection which outwardly protrudes in a radial direction of said threaded hole, and wherein an opening is formed between said restrictive wall portions for passage of said projection.

3. The door hinge mounting structure as set forth in claim 2, wherein said restrictive wall portions each form a portion which faces said opening along directions in which said retaining member rotates around said threaded hole.

4. The door hinge mounting structure as set forth in claim 1, wherein said restrictive wall portions are provided in a recessed portion formed on said door panel or said door mounting portion.

5. The door hinge mounting structure as set forth in claim 2, wherein said restrictive wall portions are provided in a recessed portion formed on said door panel or said door mounting portion.

6. The door hinge mounting structure as set forth in claim 3, wherein said restrictive wall portions are provided in a recessed portion formed on said door panel or said door mounting portion.

7. The door hinge mounting structure as set forth in claim 2, wherein said at least one projection of said retaining member comprises a pair of left and right symmetrical projections about said threaded hole.

8. The door hinge mounting structure as set forth in claim 3, wherein said at least one projection of said retaining member comprises a pair of left and right symmetrical projections about said threaded hole.

9. The door hinge mounting structure as set forth in claim 4, wherein said at least one projection of said retaining member comprises a pair of left and right symmetrical projections about said threaded hole.

10. The door hinge mounting structure as set forth in claim 5, wherein said at least one projection of said retaining member comprises a pair of left and right symmetrical projections about said threaded hole.

11. The door hinge mounting structure as set forth in claim 6, wherein said at least one projection of said retaining member comprises a pair of left and right symmetrical projections about said threaded hole.

12. The door hinge mounting structure as set forth in claim 4, wherein said door panel comprise a door frame and a door skin that cover the recessed portion thereof, and each of said door frame and said door skin has said positioning bolt passable hole.

13. The door hinge mounting structure as set forth in claim 5, wherein said door panel comprise a door frame and a door skin that cover the recessed portion thereof, and each of said door frame and said door skin has said positioning bolt passable hole.

14. The door hinge mounting structure as set forth in claim 6, wherein said door panel comprise a door frame and a door skin that cover the recessed portion thereof, and each of said door frame and said door skin has said positioning bolt passable hole.

* * * * *